(12) United States Patent
Kostrzewski et al.

(10) Patent No.: US 6,595,644 B2
(45) Date of Patent: Jul. 22, 2003

(54) DYNAMIC TIME MULTIPLEXED HOLOGRAPHIC SCREEN WITH 3-D PROJECTION

(75) Inventors: Andrew A. Kostrzewski, Garden Grove, CA (US); Tin M. Aye, Mission Viejo, CA (US); Tomasz P. Jannson, Torrance, CA (US); Gajendra D. Savant, Rolling Hills Estates, CA (US)

(73) Assignee: Physical Optics Corporation, Torrance, CA (US)

(*) Notice: Subject to any disclaimer, the term of this patent is extended or adjusted under 35 U.S.C. 154(b) by 0 days.

(21) Appl. No.: 09/924,141

(22) Filed: Aug. 7, 2001

(65) Prior Publication Data

US 2002/0034006 A1 Mar. 21, 2002

Related U.S. Application Data

(60) Provisional application No. 60/223,134, filed on Aug. 7, 2000.

(51) Int. Cl.$^7$ .............................. G03B 21/00; G02B 5/32
(52) U.S. Cl. ................................... 353/7; 359/15
(58) Field of Search ...................... 353/7, 10; 345/4, 345/5, 6, 9; 359/1, 9, 10, 11, 14, 18, 20, 23, 28, 32, 35; 352/43, 86

(56) References Cited

U.S. PATENT DOCUMENTS

| 3,479,111 | A | | 11/1969 | Gabor |
| 4,799,739 | A | | 1/1989 | Newswanger |
| 4,926,412 | A | | 5/1990 | Jannson et al. |
| 5,365,354 | A | | 11/1994 | Jannson et al. |
| 5,886,675 | A | * | 3/1999 | Aye et al. .................. 345/7 |
| 5,926,294 | A | * | 7/1999 | Sato et al. ................. 359/22 |
| 6,195,184 | B1 | * | 2/2001 | Chao et al. ............... 359/22 |

* cited by examiner

Primary Examiner—Russell Adams
Assistant Examiner—Andrew Sever
(74) Attorney, Agent, or Firm—Leonard Tachner

(57) ABSTRACT

A dynamic time multiplexed holographic system including a holographic screen and a projector that projects successive perspective images onto the holographic screen. The projector includes a rotating polygon that provides successive image slices to the holographic screen and a spatial light modulator that provides successive image slices to the rotating polygon. The holographic screen refracts the successive perspective images perpendicular to the holographic screen.

18 Claims, 8 Drawing Sheets

DYNAMIC TIME MULTIPLEXED HOLOGRAPHIC SCREEN WITH 3-D PROJECTION

This application claims the benefit of provisional application 60/223,134 filed Aug. 7, 2000.

BACKGROUND OF THE INVENTION

1. Field of Invention

The present invention is directed to the field of three-dimensional (3-D) displays. More particularly, the present invention concerns 3-D displays that do not require the viewer to wear goggles or glasses.

2. Description of Related Art

Presently, most 3-D systems rely on visual channel separation, either by orthogonal polarization states to represent left and right images, shutters to synchronize the display with goggles, or red/blue color coding. In stereoscopy, the left and right eye viewing channels are fused by the viewer into a 3-D view of the world. There are a few stereoscopic systems that produce 3-D images without any headgear, but they suffer severe limitations. Real 3-D displays based on volumetric projection, as from a spinning display screen, can show correct perspectives to multiple viewers, but are inherently limited in resolution and image refresh speed, since they require every point in the volume (every pixel) to be modulated and displayed sequentially.

Still other prototype displays based on conventional static holograms or laser illumination of spinning objects cannot produce satisfactory imaging. Because these displays, based on differential polarization, require lengthy preparation of several perspective views of the scene, such as heavy computations and special formatting, they are not suited for real-time applications.

Stereo vision is based on the perception of depth. Stereo display systems are based on the most dominant depth cue (i.e., parallax), which is defined as the angular separation between corresponding points of left and right perspective images. In this respect, human 3-D vision does not require "real" 3-D information, since the human brain encounters only two 2-D retinal images, neither of which preserve z-axis (i.e., depth) information. This third dimension is reconstructed only in the brain. Therefore, 3-D displays can be based on capturing and displaying a 2-D left image and a 2-D right image in order to replicate the corresponding left and right retinal images.

As noted above, stereoscopic displays provide an observer with parallax depth cues. This is done by presenting each eye with a view of an object from a different perspective viewpoint. When the difference between these viewpoints approximates normal interocular separation, an impression of viewing an actual solid object is created. Conventionally, some form of viewing device, such as glasses, is required to channel a different view into each eye. This is quite effective in presenting a three dimensional impression, and it requires only twice the amount of image data compared to a two dimensional view. The major drawback is the need to wear a device or to peer into eyepieces. This has led to many years of effort to provide directly viewable (i.e., stereoscopic without glasses) or, more precisely, autostereoscopic images.

Autostereoscopic displays create a "window" through which an unaided observer can view what appears to be a solid object. This is a very natural and desirable situation from the standpoint of the observer, but involves two substantial technical challenges. First, the light rays leaving the display must be directed so that each of the observer's eyes receives a complete but different image. Second, images of the object from a range of viewpoints must be presented simultaneously. There may be as few as two perspective views, but typically four or more are required to provide a range of viewing positions (scenes). This greatly increases the amount of image data which must be managed.

Holographic displays and lenticular photographs are the most familiar examples of autostereoscopic images. Holographic displays (or holograms) are an interferometric pattern of a recorded object which can be reconstructed by a collimated beam.

Recently, considerable interest has been directed toward autostereoscopic techniques which are based on the multiplex carrier method. This approach is simple, practical, and low cost and provides a limited "look-around" 3-D effect if more than two perspectives are projected into the viewing eyebox. If the number of perspectives is low enough, images may be generated and displayed in real-time because the data processing demands can be satisfied. However, in this technique, the image projection area must be divided into two separate parts, which significantly reduces the image's spatial resolution. Further, this technique has additional drawbacks-because it requires sequential scanning of N perspectives (N>1) for each vertical scan line. The line feed rate R to the multiplexed monitor is related to the flicker-free line rate r by R=N×r. Thus, the feed signal rate is increased two or more times relative to the rate necessary for monocular monitor.

In sum, in many technical fields, 3-D displays can provide scientists and technicians with the ability to better interpret the physical parameters of an image being displayed. 3-D display techniques have been attempted in the past, but have suffered from the need for the observer to wear external devices, the loss of real-time display capabilities, a lack of full screen resolution, the need for heavy computation and special formatting, very high cost, and/or any combinations of the above. A truly practical device must be able to interface with conventional 2-D display systems in order to increase vendor acceptance, provide real-time capabilities for interactive applications, and provide 3-D look around capabilities without special viewing glasses. In addition, a cost effective production method must be established to make the device attractive for commercial markets.

The disclosures of all the below-referenced prior United States patents in their entireties are hereby expressly incorporated by reference into the present application for purposes including, but not limited to, indicating the background of the present invention and illustrating the state of the art. U.S. Pat. No. 3,479,111 discloses a three-dimensional picture projection. U.S. Pat. No. 4,799,739 discloses real time autostereoscopic displays using holographic diffusers. U.S. Pat. No. 4,926,412 discloses a high channel density wavelength division multiplexer with defined diffracting mean positioning. U.S. Pat. No. 5,365,354 discloses a GRIN type diffuser based on volume holographic material. U.S. Pat. No. 5,886,675 discloses an autostereoscopic display system with a fan-out multiplexer.

SUMMARY OF THE INVENTION

The present invention includes a holographic screen and a projector that projects successive perspective images onto the holographic screen. The projector can include a rotating polygon that provides successive image slices to the holographic screen and a spatial light modulator that provides successive image slices to the rotating polygon. The holographic screen refracts the successive perspective images perpendicular to the holographic screen.

The invention provides for a 3-D system for scientific data visualization based on direct viewing of an interactive environment that simulates reality in a natural way. It can be used in, for example, training, remote simulation, and entertainment applications. The invention does not require any special eyewear and provides total flexibility of position for viewing 3-D video/graphics. The invention also provides unique high-speed multiview virtual world generators with interactive capabilities and high speed scanning for 3-D image generation.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1A:
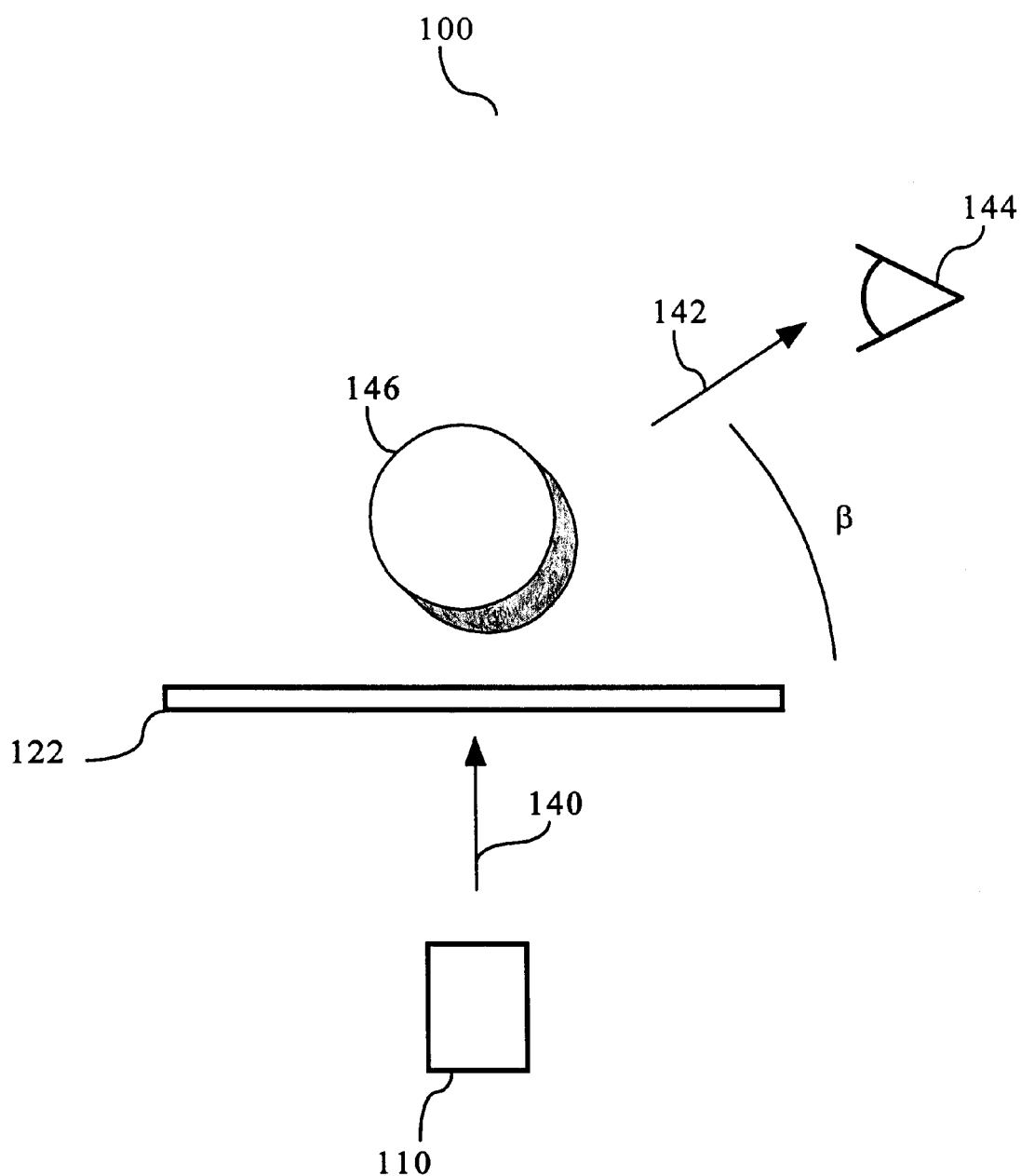
FIG. 1a is an exemplary illustration of a three-dimensional display system according to a preferred embodiment.
Figure 7:
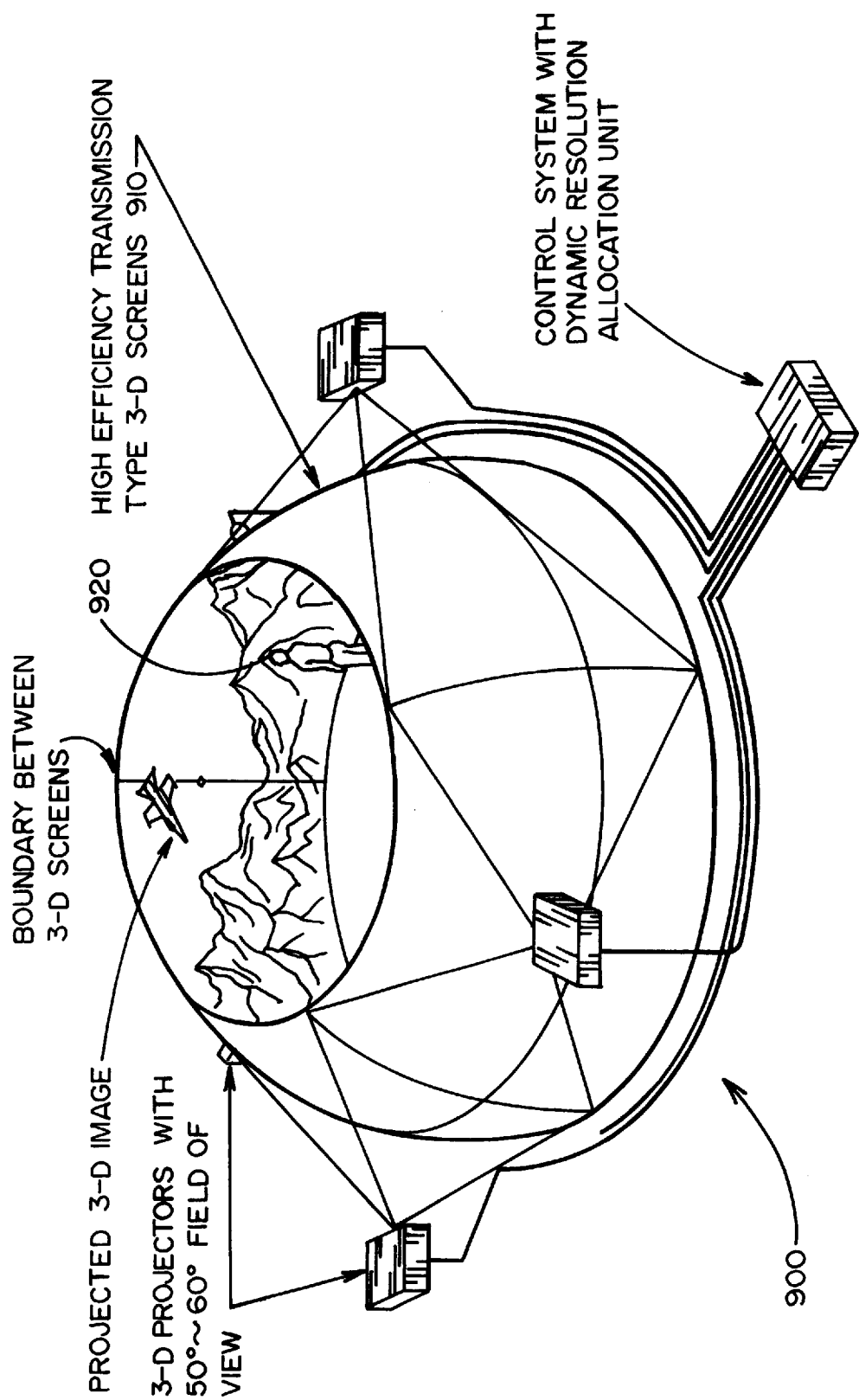
FIG. 7 is an exemplary illustration of a system as a virtual reality visualization system that delivers true 3-D video to multiple viewers according to an exemplary embodiment.

FIG. 1a is an exemplary illustration of a three-dimensional display system 100 according to a preferred embodiment. The system 100 includes a projector 110 and a holographic screen 122. In a preferred embodiment, the screen 122 is created according to the procedure disclosed in FIG. 7 and the projector 110 comprises the projector disclosed in FIG. 2. In operation, the projector 110 projects a playback beam 140 towards the screen 122. The screen diffracts the beam 142 towards a viewer 144. The beam 142 is diffracted at an angle p according to the design of the screen 122 as illustrated in FIG. 7. For example, the beam 142 is diffracted at an angle of 30 degrees. Thus, the viewer 144 can perceive a 3-D image 146 above the screen 122. For example, the screen 122 can be located on a table and the viewer standing next to the table can perceive the 3-D image 146 above the table.

Figure 1B:
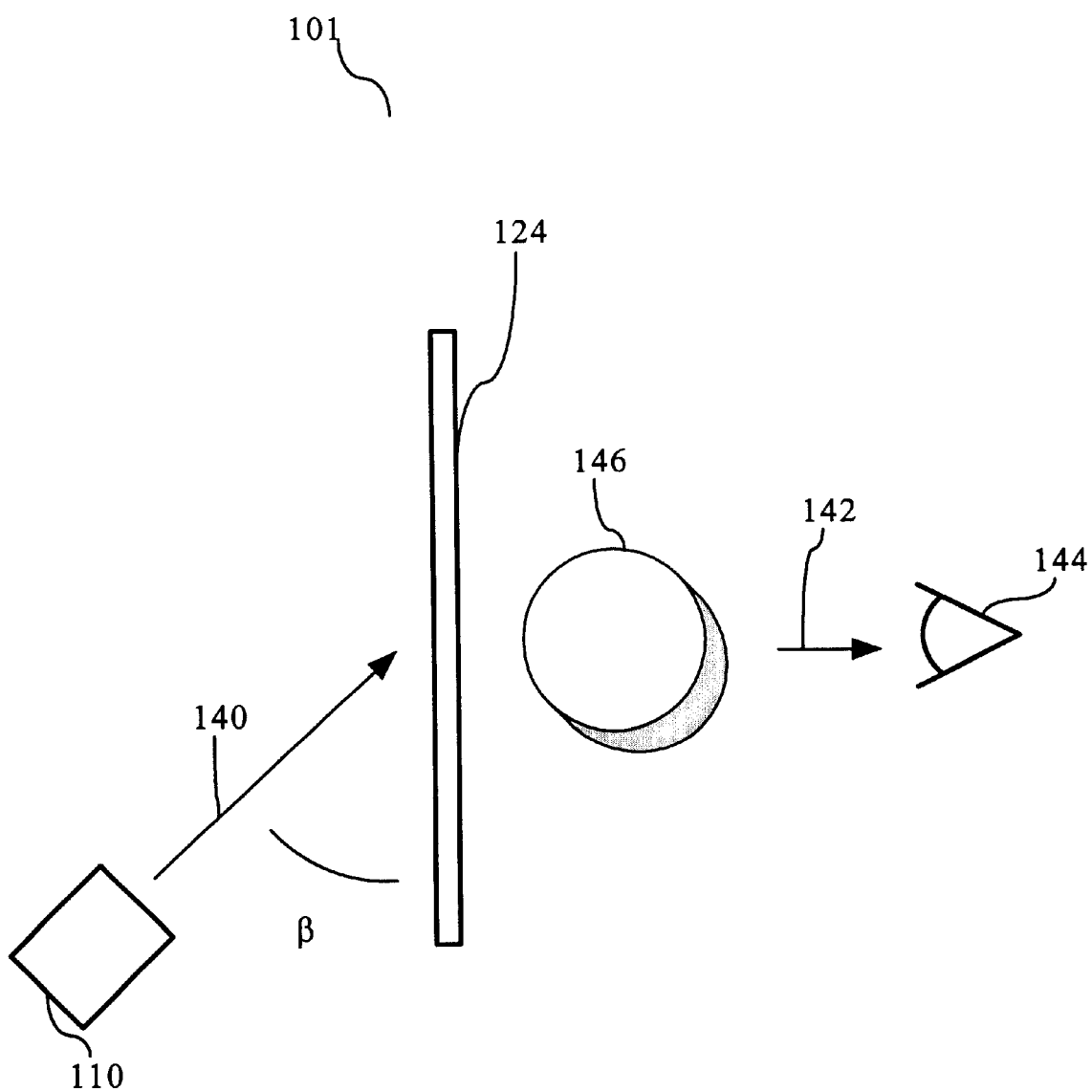
FIG. 1b is an exemplary illustration of a three-dimensional display system according to another embodiment.

FIG. 1b is an exemplary illustration of a three-dimensional display system 101 according to another embodiment. The system 101 includes a projector 110 and a holographic screen 124. In a preferred embodiment, the projector 110 comprises the projector disclosed in FIG. 2. In operation, the projector 110 projects a playback beam 140 towards the screen 124, the screen diffracts the beam 142 towards a viewer 144, the beam 142 is projected at an angle β. For example, the beam 142 is projected at an angle of 30 degrees. Thus, the viewer 144 can perceive a 3-D image 146 in front of the screen 122. For example, the screen 122 can be located on a monitor and the viewer standing in front of the monitor can perceive the 3-D image 146 in front of the monitor.

Figure 2:
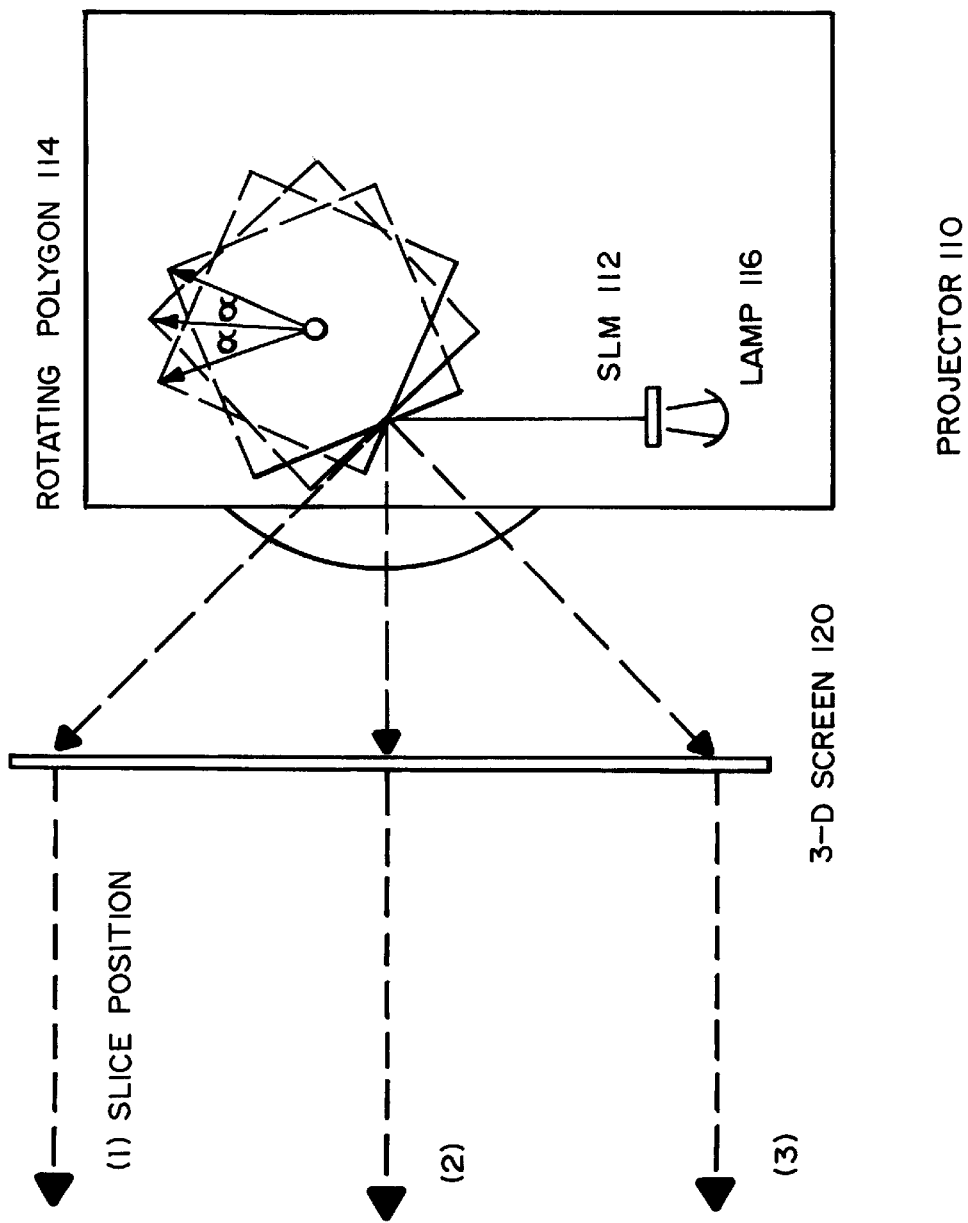
FIG. 2 is an exemplary top view illustration of the geometry of dynamic time multiplexed holographic scanning according to one embodiment.

FIG. 2 is an exemplary illustration of the geometry of dynamic time multiplexed holographic scanning according to one embodiment. The principle of the dynamic time multiplexed holographic system operation is based on two elements: a 3-D screen such as a holographic screen 120 and a slice scanning system, such as the projector 110, which together produce multiple narrow, for example, 2 mm wide slices of images projected laterally across the screen 120. The screen comprises a screen 122 or a screen 124 as illustrated in FIGS. 1a and 1b respectively, and the projector 110 includes a spatial light modulator (SLAM) 112, a lamp 116, and a rotating polygon 114. The polygon 114 has, for example, 4, 6, or 8 faces and rotates in successive angular intervals α to provide the successive image slices to the screen 120.

In operation, the 1amp 116 provides light to the SLM 112 which projects sequential image slices to the rotating polygon 114. The rotating polygon 114 then redirects each successive image slice to a different portion of the holographic screen 120 starting at one portion of the screen, "Slice Position (1)" as shown in FIG. 2, and continuing across the screen to the opposite edge. After the last image slice is projected on the opposite edge of the screen, scanning returns to "Slice Position (1)" and proceeds as before. In particular, a single frame image corresponding to a specific location (e.g., Slice Position (1) in FIG. 2) is produced on the fixed SLM 112. The SLM 112 is illuminated by a white light lamp 116 that in passing through the SLM 112 is modulated according to the image content. The rotating polygon 114 deflects the modulated light from the SLM 112 to illuminate the 3-DD screen 120 from a constantly varying angle α. The 3-D screen 120 is capable of redirecting the incoming light into a narrow slice 125 in front of the screen. The image displayed on the slice 125 is synchronized with the particular viewing direction it corresponds to. The 3-D effect is achieved by guiding scanning of the slit and simultaneously displaying the corresponding view. When the slit moves to the next position, the next view is displayed. The slits are displayed sequentially in the area in front of the screen but at such a high refresh rate that the viewer does not notice. The SLM 112 can be replaced, for example, by a high speed video projector based on a digital micromirror device or ferroelectric liquid crystal.

To keep the projector 110 compact, the optical path is folded. The multiplexed holographic screen 120 provides for 3-D viewing from any arbitrary viewer position within a 60°×45° solid angle. The output brightness of the projector 110 is maximized by using a highly efficient 300 W metal-halide lamp with an integrated light tunnel (not shown). The light tunnel can be optimized using ray-tracing software.

Figure 3:
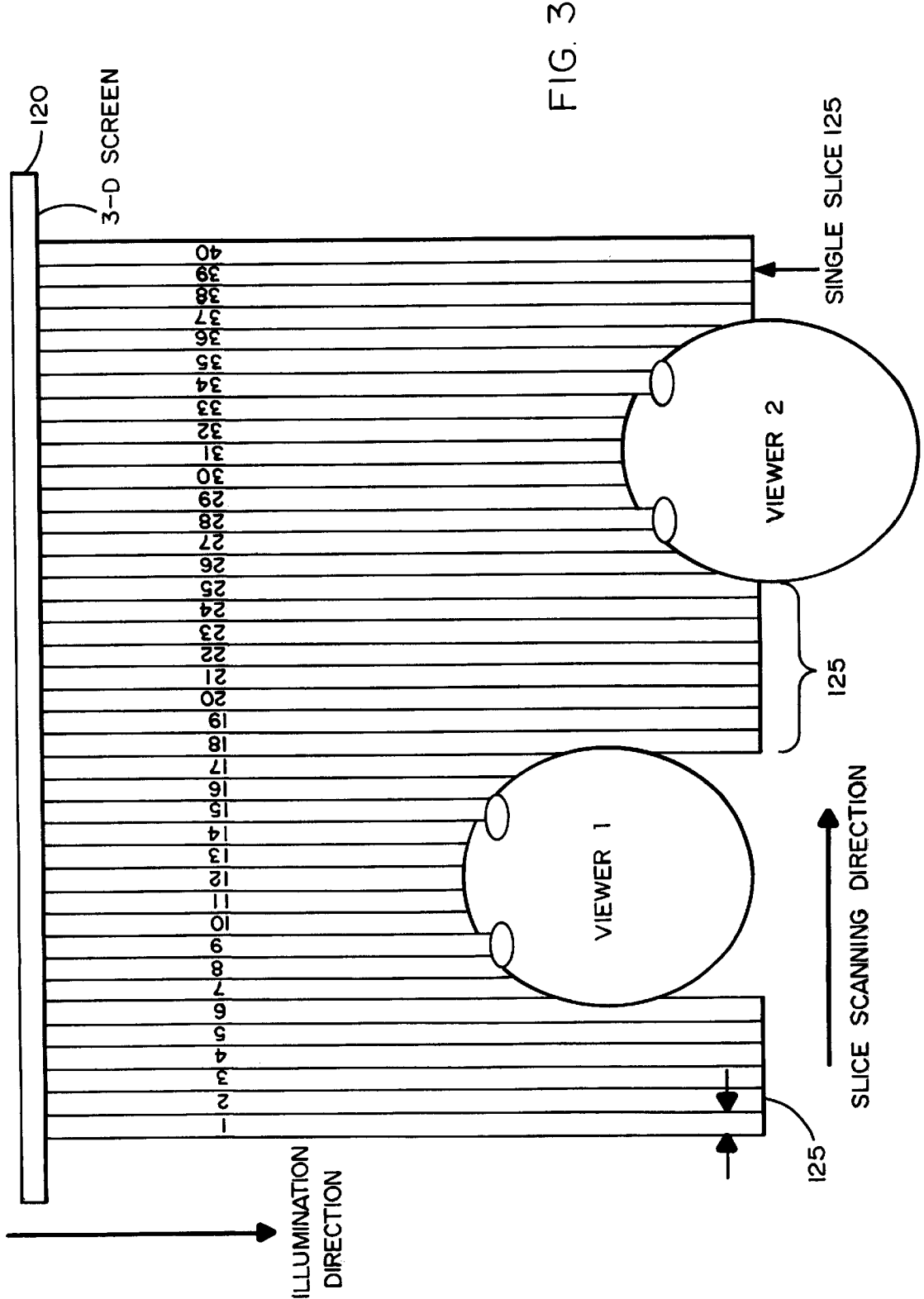
FIG. 3 is an exemplary illustration of the geometry of a 3-D effect according to one embodiment.

FIG. 3 is an exemplary illustration of the geometry of a 3-D effect according to one embodiment. Viewers generally have an average eye separation of 2.5 inches. Viewer 1 can see the two perspectives of slits 9 and 15, while the viewer 2 can see the perspective of slits 28 and 34. Each slit position represents a different perspective on the virtual world. Therefore, each viewer can perceive a different perspective of an image in 3-D and can move to the left or the right to "look around" the image. Stereoscopic viewing is not limited to static projection or monochromatic images. The projector 110 and holographic screen 120 can display real-time, dynamic full color-3-D live images from computer graphics and video.

Figure 4:
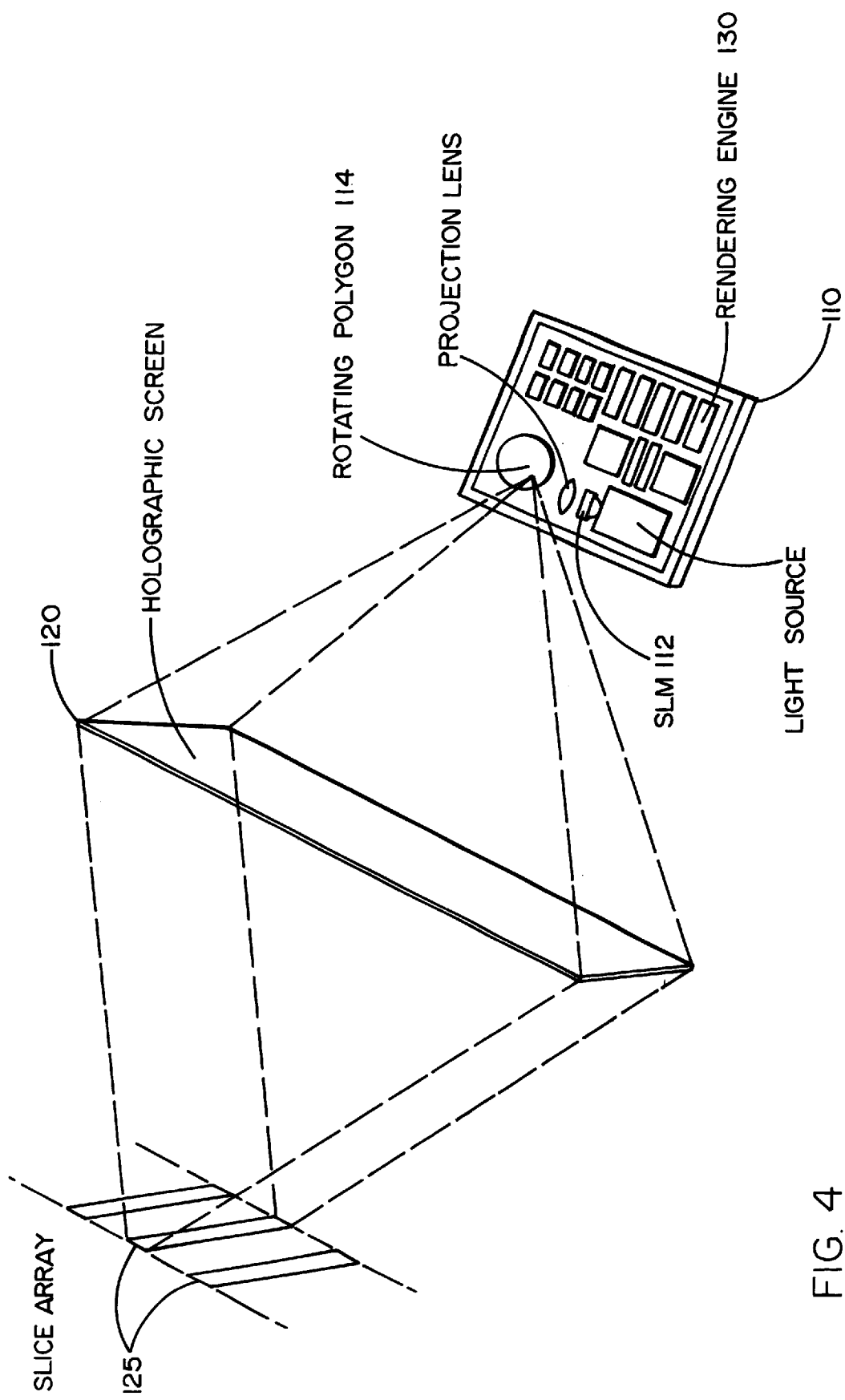
FIG. 4 is an exemplary illustration of the structure of a projector according to one embodiment.

FIG. 4 is an exemplary illustration of the structure of a projector 110 according to one embodiment. The projector 110 contains a single high speed SLM 112 driven by a rendering array 130. A high-speed polygon prism 114 spatially (angularly) multiplexes viewing slices into the space behind the screen 120. The speed of the projector 110 is proportional to the number of slices to be produced in each full scan. Assuming 1° separation between slices and a projector 110 that projects 60 slices on to the screen 120, the frame rate of the SLM 112 can be 1,800 frames per second, because 30 frames per second per slice is adequate for flicker-free viewing Holographic screen technology is useful for the system 100. A large number of viewing zones can be made possible by proper recording of the hologram as explained below. This permits viewing from many perspectives with true 3-D look-around capability over a wide field-of-view. For example, a large screen can be assembled, for example, by tiling multiple 36 in. diagonal screens into a full 6 ft. ×5 ft. screen. The holographic screen 120 can be recorded using a high power Coherent Innova 2000 argon laser, which delivers 20 W of optical power at 514.5 nm. Because fabricating volume holograms by direct laser exposure can be expensive for low-cost large screens, this approach can be used to produce initial master holograms such as holographic plate 270, which can be replicated through a step and repeat process.

Figure 5:
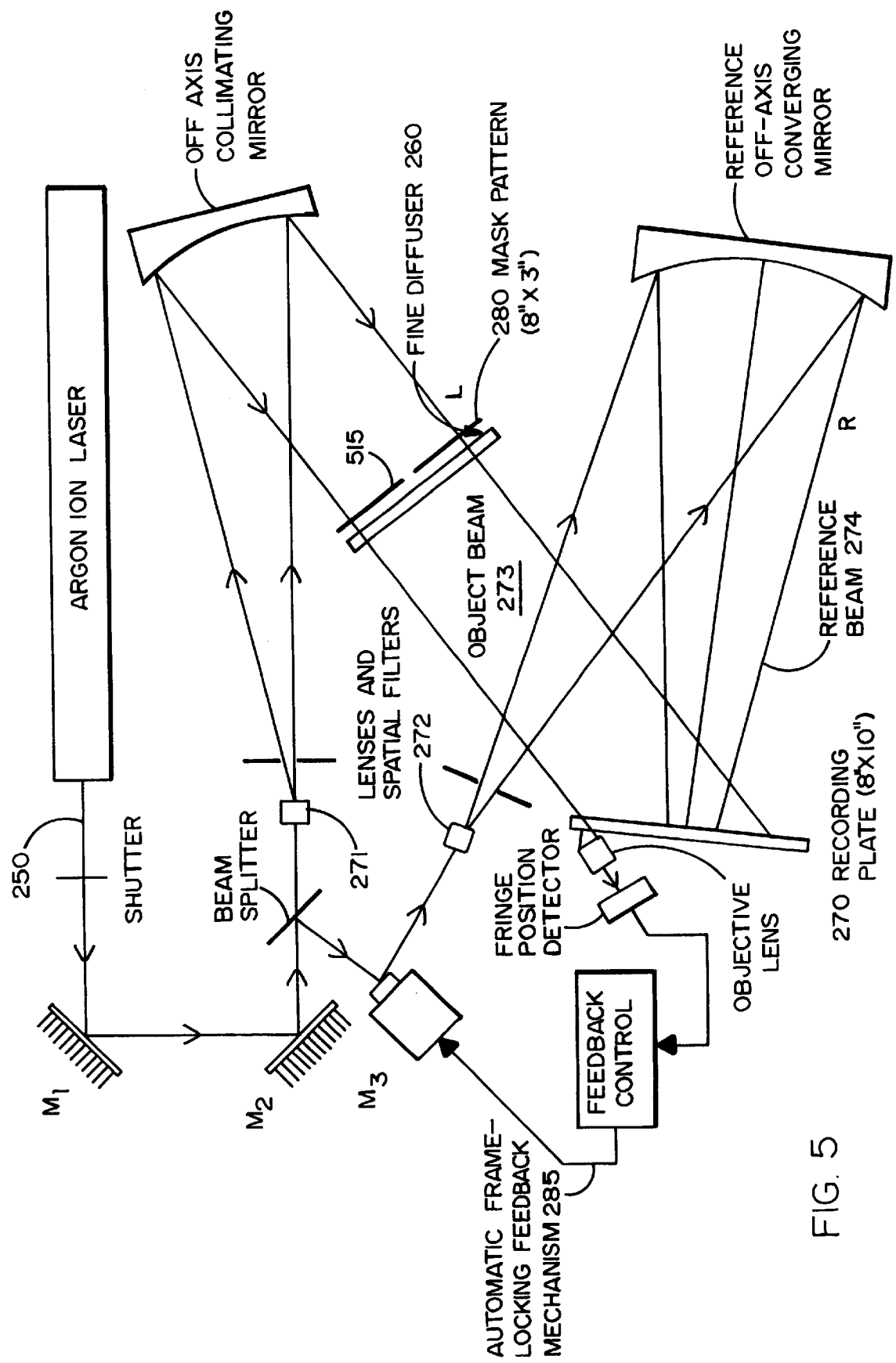
FIG. 5 is an exemplary illustration of basic recording geometry according to one embodiment.

FIG. 5 is an exemplary illustration of basic recording geometry useful for recording a holographic plate of the type used to create the screen depicted in FIG. 1*a* (where the playback beam is perpendicular to the screen). In operation, a laser beam 250 is split into object and reference beams 273 and 274 respectively and is expanded and collimated by lenses and spatial filters 271 and 272. The object beam 273 illuminates a fine duffuser 260 (either ground glass or the holographic diffuser of U.S. Pat. No. 5,365,354), with a mask pattern 280. The reference beam 274 converges from an off axis point and illuminates the recording plate 270. The recording plate 270 can be a holographic recording plate. The angle of convergence perferably is the conjugate of the angle of divergence of the light a viewer would experience during playback. The interference fringes created by the two beams will be recorded as a complex volume grating in the recording medium since fringe stability to a fraction of a wavelength is desirable, an automatic fringe locking feedback mechanism 285 may be used to provide a longer exposure time without stability problems.

To record a holographic plate of the type used to create the screen depicted in FIG. 1*b* where the playback beam is at an angle of less than 90° to the screen, the holographic plate is rotated the appropriate amount with respect to the reference and object beam mirrors. For each object beam angle, and the corresponding hologram, the beam angles and geometries will be different. Multiple exposures will be made on a single recording plate 270, using optimized recording parameters, which indicate exposure times of each hologram, the beam shape, angles and power ratios, etc. Finally, the plate will be processed using predetermined processing parameters, such as the process time for each step, the temperature of processing baths, the temperature and time duration of post-baking, etc.

Figure 6:
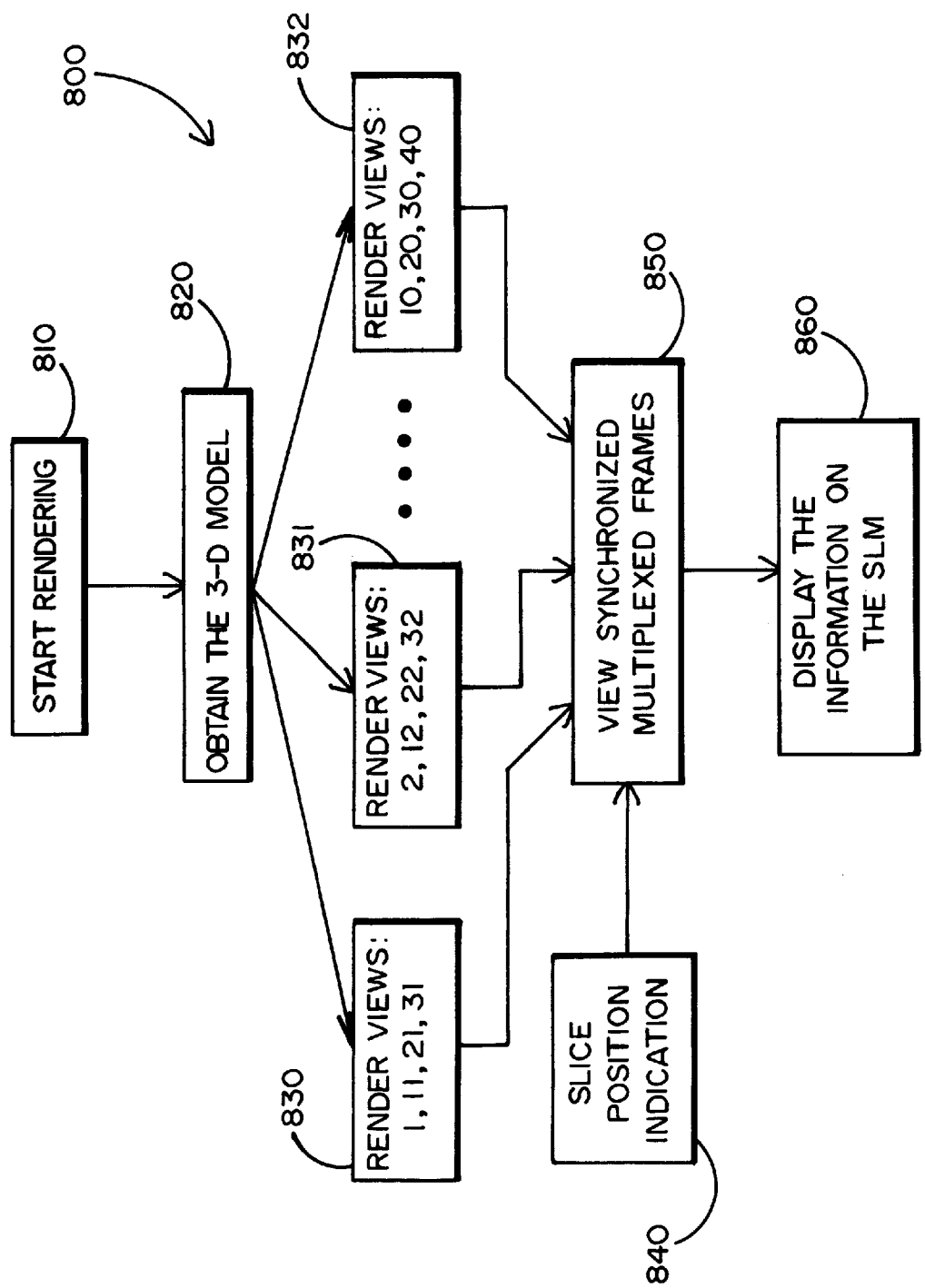
FIG. 6 is an exemplary flowchart illustrating software architecture used to generate 3-D virtual reality scenes according to one embodiment.

FIG. 6 is an exemplary flowchart 800 illustrating software architecture used to generate 3-D virtual reality scenes according to one embodiment. For example, the software can be used in rendering engine 130. In step 810, the software can initialize the rendering process. In step 820, the software can obtain a 3-D model. The 3-D model can be computer generated, can be based on actual physical objects, or can be obtained in any other appropriate manner. In steps 830–832, multiple processors can be used to render different views. In step 840, slice position indication can be obtained. In step 850, multiplexed frame views can be synchronized. In step 860, the resulting information can be displayed on the SLM 112. This software can create a 3-D image using various methods alone or in combination. For example, the software can create a 3-D image by using original 3-D programming, by using off-the-shelf 3-D software such as 3-D Lightwave and 3-D Studio, and by using 3-D scanning. Simple 3-D objects can be created directly by the software engine. More complex objects for which physical entities do not exist will first be created using Lightwave or 3-D Studio and then imported. For complex objects for which physical entities exist, 3-D scanning can be used, which is an efficient method.

Two useful factors in 3-D simulations can require careful trade-off: image quality and rendering speed. Whether the 3-D image is realistic depends strongly on the number of polygons in the 3-D models. For optimization, realism techniques can be employed that include but are not limited to texture mapping, bump mapping, and normal interpolation. The software engine can be based on OpenGL and C++, which is preferred because of the popularity of OpenGL, its inexpensive accelerator cards, platform independence, and ample software support.

In a hemispherical system, the head position can define the center of the viewpoint. For example, three "virtual cameras" fanning out evenly over 180° can be centered at a user's position. The rendering can be done in a cluster of computers. Each computer can render views corresponding to several viewing directions.

Since the views can be updated continuously for every slice, a viewer can freely move around a viewing zone without any restriction on body or head position. Several possible configurations for rendering can be considered. A single fast computer can generate images at the same speed as slice scanning, e.g., for 30 slices it would have to render one view (slice) per 1 ms time frame. A cluster of computers can relax this requirement proportional to the number of computers, e.g., using a cluster of 10 PCs would allow 10 ms per slice for rendering.

FIG. 7 is an exemplary illustration of a system 900 as a virtual reality visualization system that delivers true 3-D video to multiple viewers according to an exemplary embodiment. A multiplexed holographic screen 910 and special 3-D projection can produce full 3-D immersion. The holographic screen 910 can include multiple screens 120 from FIG. 1. The special 3-D projection can include multiple projectors 110 from FIG. 1. The special holographic screen 910 is a useful component because it produces a 3-D volume of visual information in front of a viewer 920. The volumetric-like display can be achieved by projecting slightly different views of the environment at a high refresh rate. All views can be updated every 30 ms, with both spatial (angular) and temporal multiplexing of the visual channels. Each spatial channel can display only the image associated with a specific predefined view, and the channel assignment is fixed. For simplicity only one viewer 920 is shown. The extension to multiple viewers does not require any modification of the system. The viewer 920 can move freely within a volumetric 3-D zone that extends out from about two feet from the screen. The holographic screen 910 can converge the light into a narrow beam slice representing a single view of the virtual world. Illuminating the screen from ~1° to the side produces the adjacent viewing position slice. If the display information is synchronized with the rendering of the corresponding view, a true 3-D effect results.

The geometry shown makes use of three separate projection systems, each covering a 60° field of view, creating a total 180° viewing field. Additional projection systems can be added to increase this to a full 360° virtual reality immersion capability. Each projection system consists of a high frame rate 3-D video/graphic projector. For example, ferroelectric LCDs are available that are capable of 10,000 frames per second at a full resolution of 1024×756 pixels. The high frame rate is useful, since all viewing slices can be scanned within approximately 30 ms to produce flicker-free visualization. The parallel rendering system can be synchronized with the current viewing location (slice location), and can render a view of the virtual world for the particular slice. Since the model of the virtual world is defined, several simultaneous renderings can be incorporated for smooth transition among adjacent viewing slices.

The system 900 according to one embodiment has 180° visualization capability based on three projectors, each covering a solid angle of 60°×45° (3×4 aspect ratio). It can include full-color 3-D display capability and with greater than 1280×1024 pixel resolution per single channel with a frame rate in excess of 60 fps. Typical performance characteristics of the system are summarized in Table 1.

TABLE 1

| | |
|---|---|
| Number of projectors | Three 3-D projectors |
| Frame rate | 60 Hz |
| Resolution | 1280 × 1024 per 3-D channel (3584 × 1024 for a total of 180° with two 64 pixel overlaps |
| Head movement | Flexible within cylinder of 40 in. radius |
| Screen size | 6 ft. × 5 ft. single panel (18 ft. × 5 ft. total) |
| Number of channels | Three 3-D channels |
| Brightness on the screen | 300–400 lumens |
| Rendering system | Adapt existing network of three SGI workstations or 1 GHz PC |

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A dynamic time multiplexed holographic system comprising:
   a holographic screen; and
   a unitary projector that projects successive perspective images onto the holographic screen;
   the holographic screen configured for refracting the successive perspective images perpendicular to the holographic screen.

2. The dynamic time multiplexed holographic system according to claim 1, wherein the projector further comprises a rotating polygon that provides successive image slices to the holographic screen.

3. The dynamic time multiplexed holographic system according to claim 2, wherein the projector further comprises a spatial light modulator that provides successive image slices to the rotating polygon.

4. A dynamic time multiplexed holographic system for producing an image having a volume of visual information comprising:
   a holographic screen configured to produce the image having a volume of visual information; and
   a unitary projector configured to project different channels including slightly different views of the image via the holographic screen to generate the volume of visual information;
   the holographic screen also being configured for diffracting said image views perpendicular to the screen regardless of the angle of incidence onto said screen.

5. The dynamic time multiplexed holographic system according to claim 4, wherein the views are updated approximately every 30 ms.

6. The dynamic time multiplexed holographic system according to claim 4, wherein the projector comprises:
   a light source;
   a rotating polygon coupled to the light source, the rotating polygon configured to spatially multiplex viewing slices onto the holographic screen.

7. The dynamic time multiplexed holographic system according to claim 6, wherein the projector comprises:
   a spatial light modulator coupled between the light source and the rotating polygon; and
   a rendering engine coupled to the spatial light modulator, the rendering engine configured to drive the spatial light modulator.

8. The dynamic time multiplexed holographic system according to claim 6, wherein the holographic screen is configured to converge light from the rotating polygon into narrow beam slices each representing a single view of the image.

9. The dynamic time multiplexed holographic system according to claim 4, further comprising:
   at least one additional holographic screen configured to produce additional views of the image having a volume of visual information; and
   at least one additional projector configured to project additional different channels including slightly different views of the image via the at least one additional holographic screen to generate the volume of visual information.

10. The dynamic time multiplexed holographic system according to claim 9, wherein the at least one additional holographic screen and the at least one additional projector are configured to increase the field of view of a image having a volume of visual information.

11. The dynamic time multiplexed holographic system according to claim 9, wherein the at least one additional holographic screen and the at least one additional projector are configured to increase the field of view to a 360° view of the image having a volume of visual information for virtual reality immersion capability.

12. The dynamic time multiplexed holographic system according to claim 4, wherein the holographic screen is substantially horizontal and the projector is located below the holographic screen to generate an image above the holographic screen.

13. The dynamic time multiplexed holographic system according to claim 4, wherein the holographic screen is substantially vertical and the projector is located behind the holographic screen to generate an image in front of the holographic screen.

14. The dynamic time multiplexed holographic system according to claim 4, wherein the image is a three-dimensional full color image having a volume of visual information.

15. A method of providing an image having visual image information comprising:

transmitting spatially multiplexed viewing slices of the visual image information from a unitary projector onto a holographic screen; and refracting the visual image information via narrow visualization slits at the holographic screen said refracting causing each said visualization slit to be directed parallel to every other visualization slit.

16. The method of providing an image having visual image information according to claim 15, wherein the transmitting step further comprises:

transmitting the viewing slices of the visual image information to a rotating polygon; and reflecting the visual image information at the rotating polygon towards the holographic screen to generate spatially multiplexed viewing slices at the holographic screen.

17. The method of providing an image having visual image information according to claim 15, further comprising updating a view of the image having visual image information approximately every 30 ms.

18. The method of providing an image having visual image information according to claim 15, further comprising:

rendering the visual image information; and performing spatial light modulation to generate the visual image information.

* * * * *